US005197266A

United States Patent [19]

Kambeitz

[11] Patent Number: 5,197,266

[45] Date of Patent: Mar. 30, 1993

[54] VACUUM FOR COMBINE HARVESTER

[76] Inventor: Ben Kambeitz, Box 93, Richmond, Saskatchewan, Canada, S0N 2E0

[21] Appl. No.: 643,325

[22] Filed: Jan. 22, 1991

[51] Int. Cl.[5] ..... A01D 46/00

[52] U.S. Cl. ..... 56/13.1; 56/DIG. 8

[58] Field of Search ..... 56/12.8, 12.9, 13.1, 56/13.5, 13.6, DIG. 8, DIG. 15

[56] References Cited

U.S. PATENT DOCUMENTS

| | | | |
|---|---|---|---|
| 2,667,025 | 1/1954 | Conner | 56/126 |
| 3,212,247 | 10/1965 | Erickson | 56/126 |
| 3,961,465 | 6/1976 | Winings | 56/13.1 |
| 4,035,993 | 7/1977 | Bell et al. | 56/126 X |
| 4,292,981 | 10/1981 | De Busscher et al. | 56/14.6 X |
| 4,332,940 | 4/1982 | White | 56/12.9 X |
| 4,373,322 | 2/1983 | Beisel | 56/126 |

FOREIGN PATENT DOCUMENTS

| | | | |
|---|---|---|---|
| 1545988 | 2/1990 | U.S.S.R. | 56/DIG. 8 |

*Primary Examiner*—Thuy M. Bui
*Assistant Examiner*—Roger J. Schoeppel
*Attorney, Agent, or Firm*—Adrian D. Battison; Stanley G. Ade; Murray E. Thrift

[57] ABSTRACT

In the harvesting of a crop there is always a portion of the crop that is lost as a result of the combine harvesting process. The present device is attached to the underside of the combine and is arranged to pick up seeds and short crop missed by the first sweep of the combine. The device provides a fan arrangement within a housing carried adjacent the surface of the ground. The vacuum device picks up the seeds and short crop left behind by the normal pick up action of the combine. The present invention increases the yield of the crop, thereby making harvesting more cost efficient.

14 Claims, 4 Drawing Sheets

3 40 44 48 46 58 42 12 56 22 24 18 61 20 28 68 26 70 29 24 22 25 25 29 39 52 3 14 14

10
70
12
58
54
72
54
48
40
40
28
32
34
38
36
39
52
14
14
46
54
26
30
68

VACUUM FOR COMBINE HARVESTER

FIELD OF THE INVENTION

This invention relates to the field of harvesting machines, more particularly to a vacuum device used with the pick up of a combine harvesting machine to increase the yield of a crop.

BACKGROUND OF THE INVENTION

Combine harvesters are well known devices, used effectively for many years to harvest crops, such as grain products. In grain harvesting, there is always a portion of the crop that is lost as a result of the combine harvesting process. In particular the header, which may be a straight-cut type header for harvesting a standing crop or a pick-up type header for harvesting crop previously laid in swaths or windtows, often has difficulty picking up all of the crop or grain. In some crops it is often found that seeds and short crops are left behind as the combine cannot pick them up effectively because they are too small or have fallen too low to the ground.

Special devices have been developed to pick up this portion of the crop. The prior art demonstrates vacuum devices located under a feeding housing, to draw harvested material knocked to the ground by a conventional harvester.

In particular, U.S. Pat. No. 3,961,465 demonstrates such a device. The vacuumed grain is fed into the chaffer and separator for cleaning and combining with the primary load. The operation and structure of this device however is quite different from the present invention as the seeds, straw and heads picked up by the present invention are returned to the platform of the combine.

SUMMARY OF THE INVENTION

It is an object of the present invention therefore to provide a vacuum device that picks up seeds and short crop left behind by the normal pickup action of a combine.

It is a further object of the present invention to increase the yield of the crop which, by using the device makes the harvesting more cost efficient.

According to the present invention there is provided a vacuum pick up device for a combine harvester comprising a housing, means for attachment of the said housing to the said combine, said housing having an opening position thereon adjacent the ground and said housing having support means thereon, said housing having a front end and a rear end; drive means; at least one first fan positioned above the opening on the housing and arranged to be driven by the said drive means to direct air into the said housing; a chute attached to the housing, a second fan arranged to direct air into the chute, said chute extending from the said housing.

According to another aspect of the present invention there is provided a combine harvester comprising a header, a platform on the header, a vacuum pick up device including a housing, means for attachment of the said housing to the said combine rearwardly of the said header, said housing having an opening positioned thereon adjacent the ground and said housing having support means thereon, said housing having a front end and a rear end, at least one first fan positioned above the opening on the housing and arranged to be driven by said drive means to direct air into the said housing; a chute attached to the housing, and a second fan arranged to direct air into the said chute, said chute extending from the said housing to the said platform on the said header for transporting material from the said housing to the said header for processing in the combine.

The device is attached to the underside of the combine and is located generally on the front of the combine between the front wheels. The device is arranged to pick up seeds and short crop missed by the first sweep of the combine.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
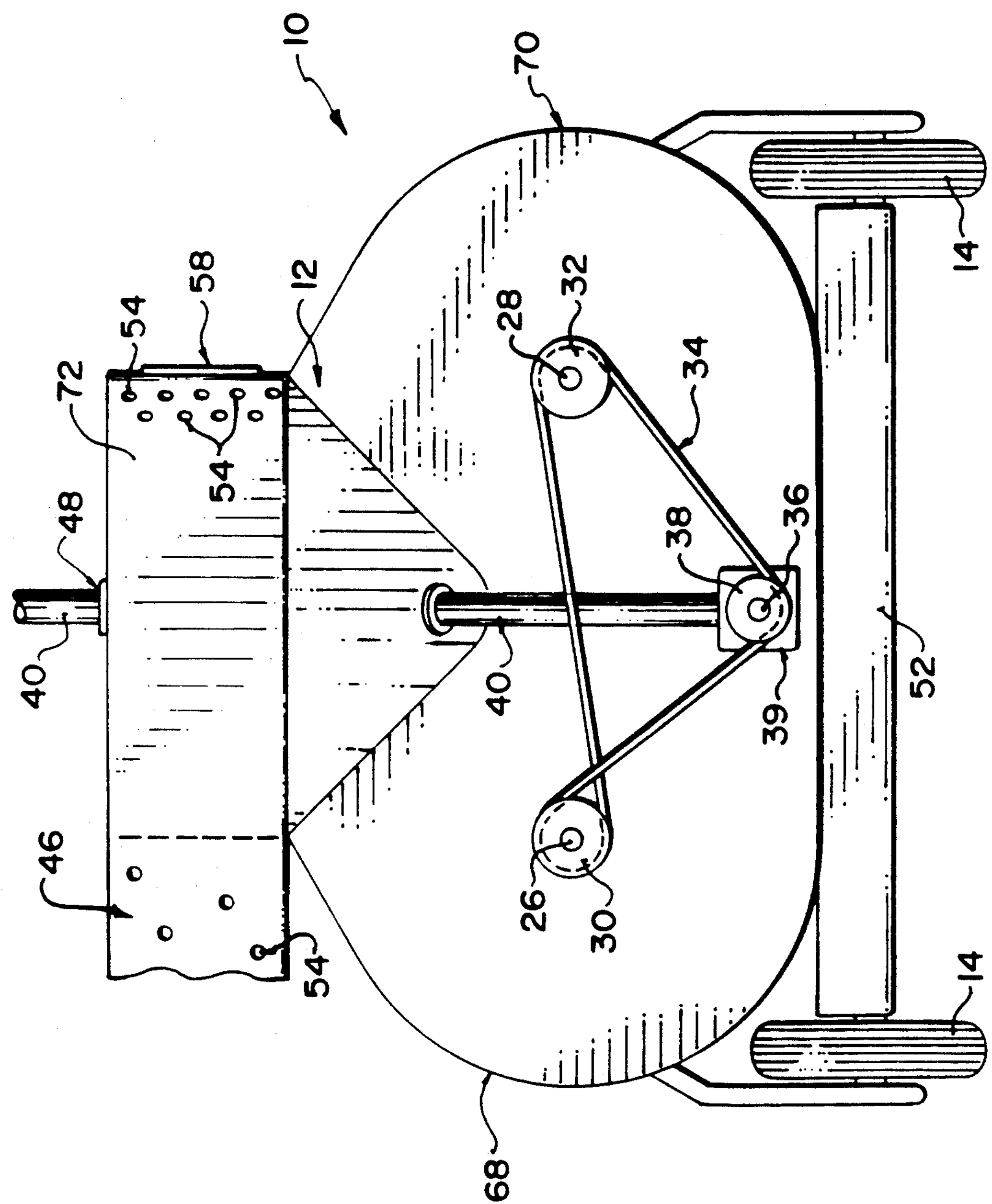
FIG. 1 is a top view of the preferred embodiment of the device.
Figure 2:
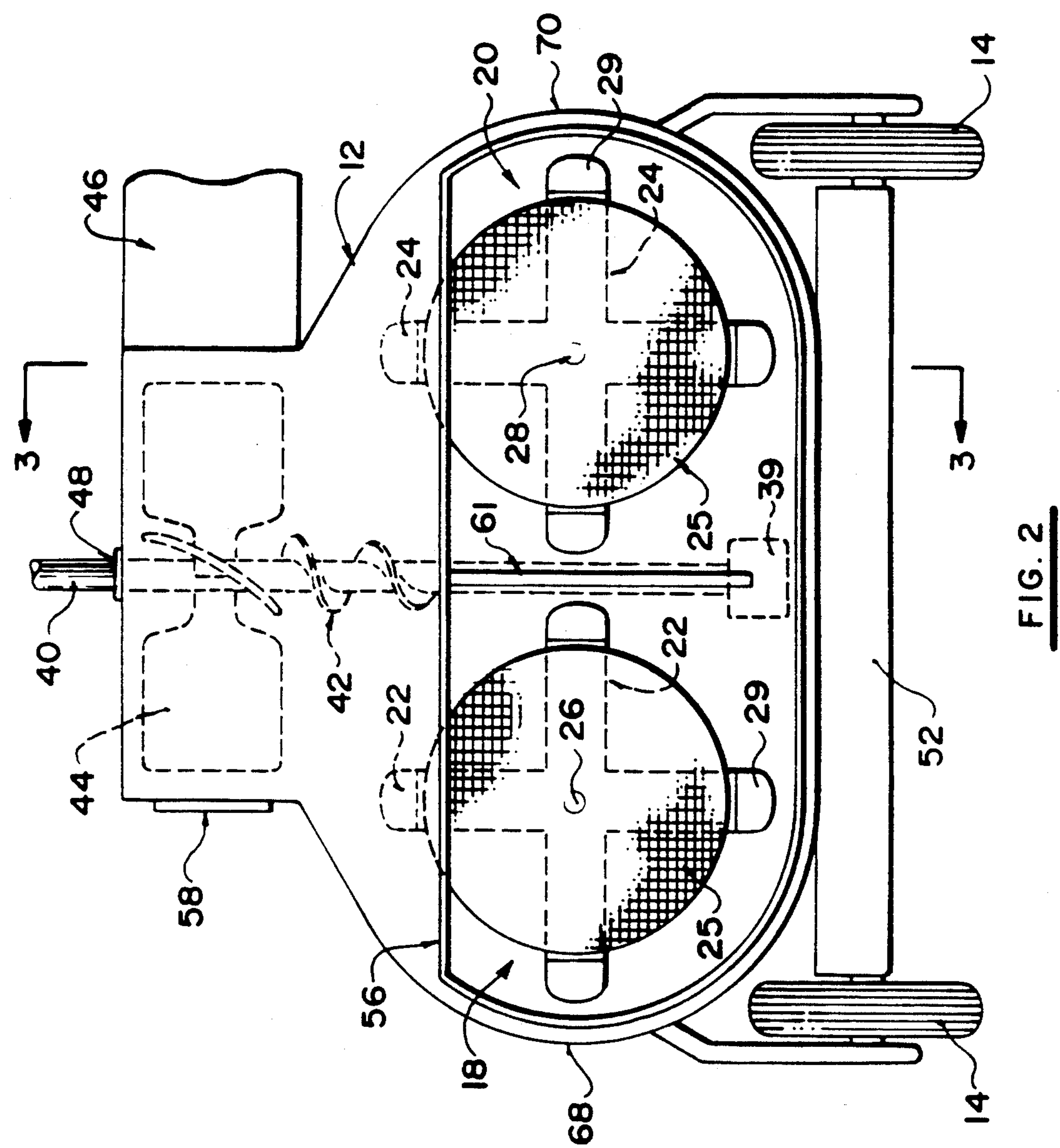
FIG. 2 is a bottom view of the preferred embodiment of the device.
Figure 3:
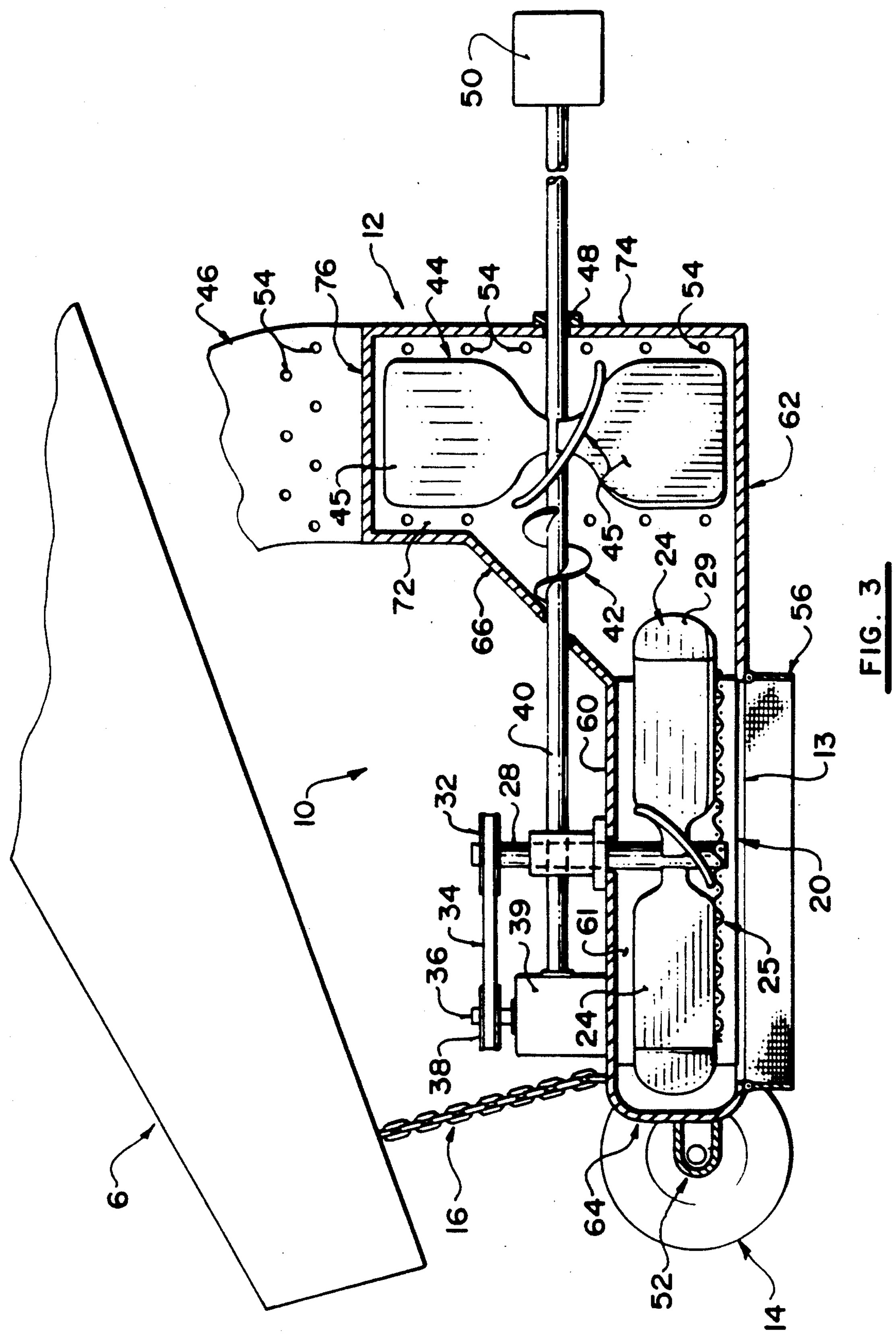
FIG. 3 is a cross sectional side view along lines 3—3 of FIG. 2.
Figure 4:
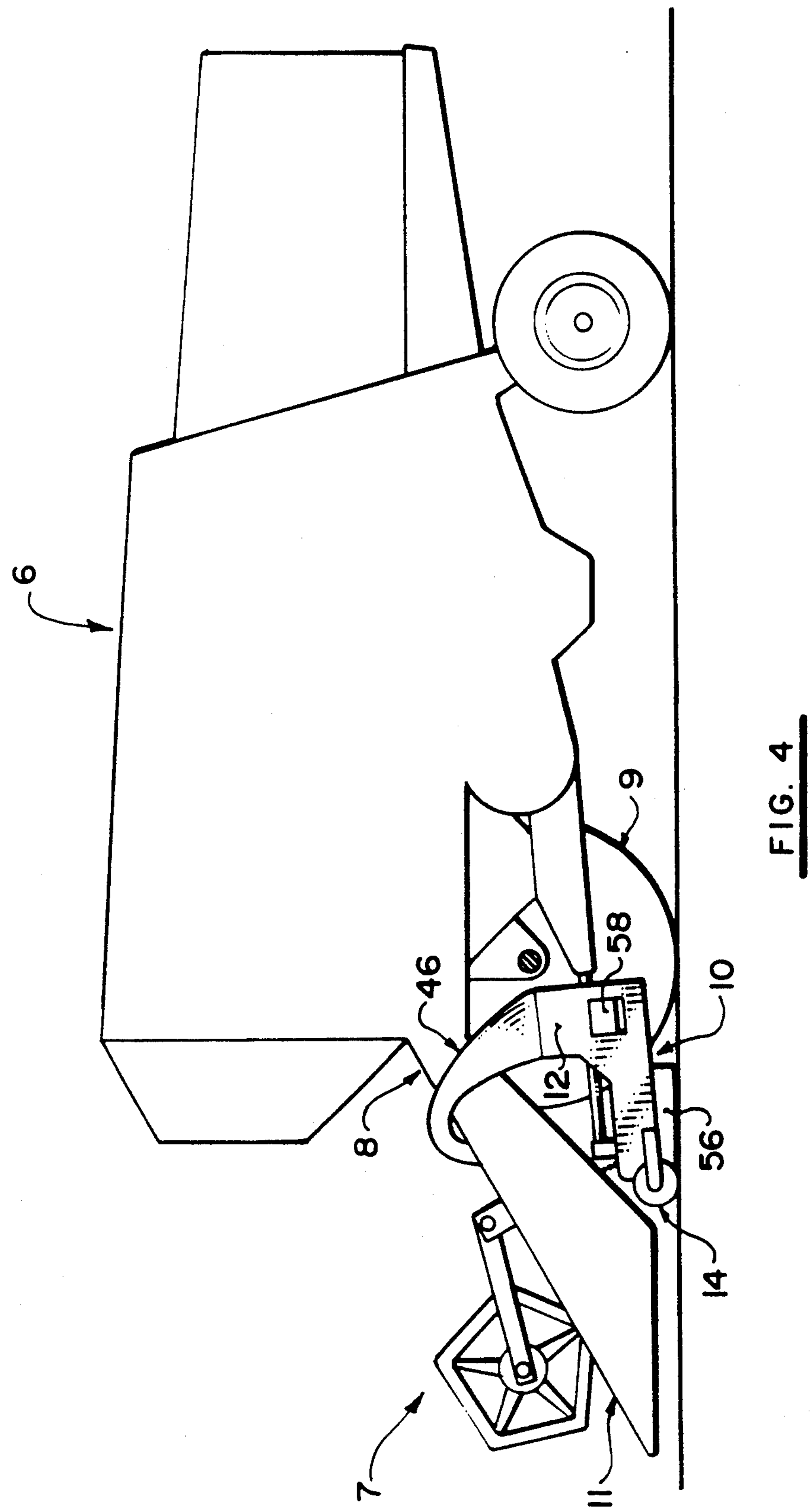
FIG. 4 is a side view of a combine with left front wheel not shown, with the preferred embodiment attached.

In FIG. 4, a combine is shown generally at 6. The combine has a header 7 a feeder housing 8 front wheels 9 and a platform 11. The vacuum pick up device is shown generally at 10 below the feeder housing 8 and between the front wheels 9.

The vacuum pick up 10 is comprised of a housing 12, supported by wheels 14, and attached to the underside of a combine by chains 16.

Within the housing 12 of the device 10, there are forwardly positioned adjacent pick up fans 18 and 20. The fans 18 and 20 are partially enclosed by the housing 12, on the top and the sides, however there is an opening 13 on the bottom of the housing 12 to allow for the pick up of material along the ground, as described later. The fans are comprised of outwardly projecting fan blades 22 and 24 carried on vertical rotating shafts 26 and 28 respectively. The fans turn in a counter-rotational manner, towards each other and rearwardly. The pitch of the blades 22 and 24 is arranged at an angle to direct air upward while moving it back within the housing.

The housing 12 is comprised of a top 60 a bottom 62 a front surface 64 depending vertically downward from the top wall 60, and two curvilinear side walls 68 and 70 depending vertically downward from the top 60. There is extending upward from the top 60 near the rear of the top 60 an upper front surface 66 that forms a front surface for the housing of a second fan 44. A curvilinear surface 72 depends rearwardly from surface 66 and encloses the second fan 44 within. There is back wall 74 extending downwardly from the top 76 of the device, between walls 68 and 70, to the bottom of the device 62.

On the lower edge of each of the fan blades is an attached round screen 25 extending outwardly from the outer edge of the shaft 26 and 28 toward the ends of the blades 22 and 24 respectively. On the outer edge of the blades 22 and 24 are plastic tips or a plastic coating 29.

The shafts 26 and 28 extend vertically upward and out of the housing 12. There are pulleys 30 and 32 fastened to the top of the shafts 26 and 28 respectively. The pulleys 30 and 32 are connected by a belt 34 engaging the pulleys and extending to a shaft 36 carrying a pulley 38, extending upwardly from a gear box 39, near the front of the device.

An elongate drive shaft 40 extends the length of the device, from the gear box 39 at the front, outside of the housing, where it attaches pulley 38 on shaft 36 extending from the gear box, into the housing 12, where carries an auger flight 42 rearwardly of the fans 22 and 24, and in front of the transverse vacuum fan 44 projecting radially from the shaft 40. The vacuum fan 44 is comprised of radially projecting blades 45 within the housing 12.

The pitch of the blades of the fan 44 is also arranged on an angle to move air upwardly and into a chute opening 46, attached to the housing and extending to a platform on the combine. The shaft 40 extends rearwardly from the attached fan and out of the housing through opening 48 to a power source 50. The shaft may be either belt driven or direct driven (not shown).

A transverse pipe 52 is attached to the front of the device to provide some protection for the device while it is moving along the surface of the ground.

On the rear of the housing 12, on the portion enclosing the fan 44 and chute 46, there is a plurality of holes 54 that allow the escape of dust from the housing during operation. There is attached to the bottom of the device a canvas apron 56 that extends around the opening between the fans 22 and 24 and downwardly therefrom to the ground, to enhance the vacuum effect of the fans within the housing.

On one side of the housing 12, near the rear of the device, there is an adjustable sliding door 58 that adjusts the pressure for the vacuum created by the fans within the housing by opening or closing the door.

The belt 34 wraps around pulleys 30, 32 and 38, all above the housing 12. The belt 34 moves the shafts 26 and 28, which turns the fans 22 and 24, within the housing 12, in a counter rotational manner. To achieve this, the belt 34 driven by the shaft 36, via drive shaft 40, must be crossed over before wrapping around the pulley 30 attached to the shaft 26. The crossing of the belt 34 is necessary to move the fans in the proper direction.

Within the housing 12 and between the fans 22 and 24 there is positioned an elongate plate 61 extending rearwardly from a position below the gear box 39 at the front of the device to a position below the auger flight 42 on shaft 40, but forwardly of the rear fan blades 44. The elongate plate 61 extends from the front to the rear of the opening 13 along the bottom of the device.

In operation, the seed and short crop is picked up by the vacuum device 10. The fans 44, 22 and 24 create a vacuum within the housing 12 and cause the loose product on the ground, below the device 10, to be sucked up through the opening 13 and into the housing. The vacuum picks up the product missed by the combine on the first pass.

The flexible apron 56 hanging from the bottom of the device, around the opening 13 on the bottom of the housing, enhances the vacuum effect of the fans within the housing. Also, since the soil surface may be uneven, the flow pattern within the device may change, particularly when the device encounters a trough. The apron 56 helps to eliminate these uneven flow patterns.

Materials are picked up off of the ground by a combination of the vacuums created in the housing by the fans. The screens 25 attached to the bottom of the fans 22 and 24 prevent the wrapping of any straw around the shafts 26 and 28 respectively.

The plastic coated tips 29 of the blades of the fans 22 and 24 prevent the chipping of the blades by stones picked up by the vacuum effect.

As the product is sucked upwardly into the housing from the ground by fans 22 and 24 it is moved along the plate 61 within the housing to the auger arrangement 42 on the shaft 40. The product then moves along the auger flight to the second transverse fan 44 on shaft 40. The fan 44 directs the product into the chute 46 that extends to a platform on the combine. The product is then deposited on the platform, from which it enters the combine system.

The wheels 14 not only act as a guide for the device, but also act as a gauge to determine the position of the vacuum device in relation to the surface of the ground.

The pitch of the blades on the pick up fans 22 and 24 is such that the air is directed upwardly and back within the device. The pitch on the transverse fan 44 is such that the air and product carried by it, is directed into the chute 46. The partially arcuate nature of the blades 45 also helps to enhance the vacuum effect within the housing 12 of the device 10.

Should the device encounter stones or rocks, it is protected by a front transverse pipe 52. Should the stone or rock be large, the entire device will adjust vertically as it is suspended by a chain 16.

The use of the present device results in a decrease of the amount of crop lost during normal combine harvesting. It is relatively simple in structure and design, and when attached to a combine, results in a more cost efficient operation.

The product is picked up off the ground and moved to the platform of the combine, and not within the combine. Fan power is used to pick up the product by creating a vacuum, rather than the suction created by the combine itself. The fan power does a more thorough job of picking up crop left behind by the first sweep of the combine than the suction ability created within the combine itself.

Since various modifications can be made in my invention as hereinabove described, and many apparently widely different embodiments of same made within the spirit and scope, it is intended that all matter contained in the accompanying specification shall be interpreted as illustrative only and not in a limiting sense.

I claim:

1. An airflow pick up apparatus for lifting crop materials from the ground for transportation to a harvesting machine, the apparatus comprising a housing, means for supporting the housing for movement across the ground in a working direction, a first and a second fan member mounted in the housing in a common horizontal plane each for rotation about a vertical axis with the vertical axis being arranged at transversely spaced positions on either side of the central line of the housing parallel to the working direction and a common plane at right angles to the working direction, means driving the first and second fan members in opposed directions about said vertical axis so as to move the crop material inwardly towards the central line and rearwardly from said common plane, a third fan member positioned in the housing rearwardly of the first and second fan members for receiving the crop material from the first and second fan members, means for rotatingly driving the third fan member and duct means connected to the housing at the third fan member for receiving the crop material from the third fan member, said third fan member being mounted on a horizontal shaft lying substantially on said central line, the duct member extending from the housing in a direction radial to the horizontal shaft.

2. The apparatus according to claim 1 wherein the third fan member is arranged such that the shaft is positioned above the first and second fan members and the third fan member includes fan blades having an outermost edge which passes in a circular path around the horizontal shaft, a lowermost point of the circular path lying in a horizontal plane which is substantially common with a horizontal plane lying at a bottom of the first and second fan members and at a bottom of the housing.

3. The apparatus according to claim 1 including input drive means for driving the horizontal shaft and drive communication means for communicating drive from the horizontal shaft to each of the first and second fan members.

4. The apparatus according to claim 3 wherein the drive communication means comprises a right angled gearbox having an input connected to said horizontal shaft and a vertical output shaft carrying a pulley for driving vertical shafts of the first and second fan members through a flexible drive member.

5. The apparatus according to claim 1 wherein the housing includes a wall surrounding the third fan member and wherein is provided a perforated screen mounted in the wall for expulsion of dust therethrough.

6. The apparatus according to claim 5 including an adjustable panel provided in said wall and movable to vary the size of an opening therein.

7. The apparatus according to claim 1 wherein each of the first and second fan members includes a plurality of fan blades extending outwardly from the vertical axis thereof and wherein is provided a screen member on an underside of the fan blades.

8. The apparatus according to claim 7 wherein the screen is circular with a centre lying on said vertical axis.

9. The apparatus according to claim 7 wherein the screen terminates at a position spaced inwardly from outermost edges of the blades of the first and second fan members.

10. An airflow pick up apparatus for lifting crop materials from the ground for transportation to a harvesting machine, the apparatus comprising a housing, means for supporting the housing for movement across the ground in a working direction, a first and a second fan member mounted in the housing in a common horizontal plane each for rotation about a vertical axis with the vertical axis being arranged at transversely spaced positions on either side of the central line of the housing parallel to the working direction and a common plane at right angles to the working direction, means driving the first and second fan members in opposed directions about said vertical axis so as to move the crop material inwardly towards the central line and rearwardly from said common plane, a third fan member positioned in the housing rearwardly of the first and second fan members for receiving the crop material from the first and second fan members, means for rotatingly driving the third fan member and duct means connected to the housing at the third fan member for receiving the crop material from the third fan member, wherein the housing includes a wall surrounding the third fan member and wherein is provided a perforated screen mounted in the wall for expulsion of dust therethrough.

11. The apparatus according to claim 10 wherein each of the first and second fan members includes a plurality of fan blades extending outwardly from the vertical axis thereof and wherein is provided a screen member on an underside of the fan blades.

12. An airflow pick up apparatus for lifting crop materials from the ground for transportation to a harvesting machine, the apparatus comprising a housing, means for supporting the housing for movement across the ground in a working direction, a first and a second fan member mounted in the housing in a common horizontal plane each for rotation about a vertical axis with the vertical axis being arranged at transversely spaced positions on either side of the central line of the housing parallel to the working direction and a common plane at right angles to the working direction, means driving the first and second fan members in opposed directions about said vertical axis so as to move the crop material inwardly towards the central line and rearwardly from said common plane, a third fan member positioned in the housing rearwardly of the first and second fan members for receiving the crop material from the first and second fan members, means for rotatingly driving the third fan member and duct means connected to the housing at the third fan member for receiving the crop material from the third fan member, wherein each of the first and second fan members includes a plurality of fan blades extending outwardly from the vertical axis thereof and wherein is provided a screen member on an underside of the fan blades.

13. The apparatus according to claim 12 wherein the screen is circular with a centre lying on said vertical axis.

14. The apparatus according to claim 13 wherein the screen terminates at a position spaced inwardly from outermost edges of the blades of the first and second fan members.

* * * * *